(12) United States Patent
Drew

(10) Patent No.: US 6,466,119 B1
(45) Date of Patent: Oct. 15, 2002

(54) MAGNETIC CIRCUIT

(76) Inventor: Chester Drew, 388 Rte. 87, Columbia, CT (US) 06237

(*) Notice: Subject to any disclaimer, the term of this patent is extended or adjusted under 35 U.S.C. 154(b) by 0 days.

(21) Appl. No.: 08/709,088

(22) Filed: Sep. 6, 1996

(51) Int. Cl.[7] .......................... H02K 49/00; H02P 15/00
(52) U.S. Cl. ..................... 335/306; 310/90.5; 310/92; 310/103
(58) Field of Search ................. 310/92, 93, 103–106, 310/90.5; 335/306

(56) References Cited

U.S. PATENT DOCUMENTS

| | | | |
|---|---|---|---|
| 2,741,714 A | 4/1956 | Regelman | 310/93 |
| 3,374,375 A | 3/1968 | Cook | 310/95 |
| 3,497,160 A | 2/1970 | Mobley et al. | 244/1 |
| 3,936,683 A | * 2/1976 | Walker | 310/103 |
| 4,239,092 A | 12/1980 | Janson | 188/267 |
| 4,681,197 A | 7/1987 | Pedu | 192/21.5 |
| 4,844,220 A | 7/1989 | Maji et al. | 188/267 |
| 4,856,631 A | 8/1989 | Okamoto et al. | 192/21.5 |
| 4,974,706 A | 12/1990 | Maji et al. | 188/267 |
| 5,330,967 A | * 7/1994 | Takahata et al. | 505/166 |
| 5,337,862 A | 8/1994 | Kuwahara | 188/158 |
| 5,434,549 A | * 7/1995 | Hirabayashi et al. | 335/229 |
| 5,969,589 A | * 10/1999 | Raj | 335/277 |

* cited by examiner

Primary Examiner—Ramon M. Barrera

(57) ABSTRACT

A magnetic circuit design comprises a shaft assembly (10) consisting of a moveable shaft (12) and a series of washers (14) and magnets (16) mounted axially along the length of the shaft (12). The magnets (16) are positioned between the washers (14) with like magnetic poles facing each other. Additional washers (14) and magnets (16) may be stacked axially along the shaft (12). A cylinder assembly (20) consists of a cylinder (22) with housings (24A) and (24B) in each end. The shaft assembly (10) is positioned concentrically inside cylinder assembly (20) and is relatively rotatable to cylinder assembly (20) by means of bearings (26A) and (26B) inserted into housings (24A) and (24B). A fine magnetic powder (30) fills the air gap (28) created between the shaft (10) and the cylinder (20) assemblies.

8 Claims, 8 Drawing Sheets

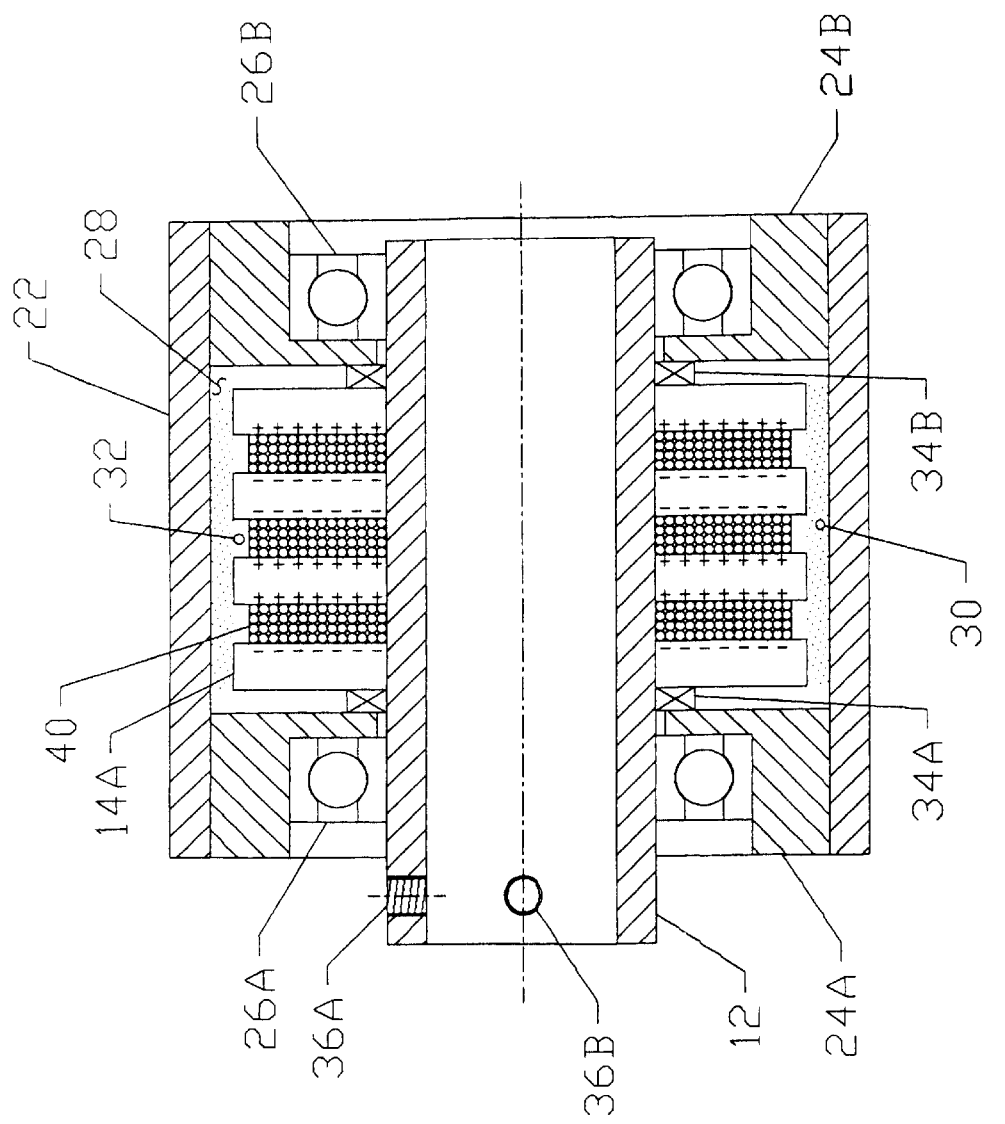

MAGNETIC CIRCUIT

BACKGROUND OF THE INVENTION

1) Field of the Invention

This invention relates to magnetic circuits which use permanent magnets to create a magnetic field, specifically the invention relates to a magnetic circuit design used in magnetic particle clutches and brakes which are used to create a resisting force for linear or rotary motion.

2) Background of the Prior Art

Magnetic particle devices have been used where long life and stable, consistent torque have been important. One example is tensioning of wire when winding electric coils. In this case, long brake life is important since the brake is slipping continuously as it applies tension to the moving wire. Furthermore, the tension must be stable and repeatable to ensure the coil is wound with consistent tension but not with tension so high that the wire stretches or breaks.

While numerous configurations have been created, many have involved complex designs which do not lend themselves to economical manufacturing and assembly procedures. For example, U.S. Pat. No. 3,374,375 requires horseshoe shaped magnets ground with a curvature to match the whell to which it is mounted. This requires expensive machining. The many internal parts increase assembly time. Also the more parts that are used, the chances for assembly errors such as misaligning components are increased. U.S. Pat. No. 4,681,197 does increase torque output per size but requires a more complex rotor design. This increases machining complexity and difficulty in assembly.

Another design, U.S. Pat. No. 3,497,160 uses an alternating magnetic field to produce torque. With this design, the torque producing element is on the inside of the electric coils. Since this necessitates a relatively small cross sectional area, torque is limited. Also heat is produced in this small, internal part which produces torque. Furthermore it is surrounded by electric coils which also produce heat. So even if the torque level can be increased, heat dissipation is limited thereby limiting the force and duty cycle of the device.

Other configurations are not intended to increase torque output per size. These designs do not address a major shortcoming of magnetic particle brakes which is their cost. More specifically, the ratio of torque produced to cost is much higher than devices which rely on friction surfaces rubbing together to produce torque. The high cost of magnetic particle brakes currently being produced limits the market potential of the product to low volume, specialty applications. For example, U.S. Pat. Nos. 2,741,714; 4,239,092; and 4,856,631 focus on features such as adjustable torque without considering how to increase the maximum torque output of the device.

U.S. Pat. No. 3,374,375 uses bucking fields in an eddy-current coupling. However it does not use them to increase magnetic field strength to produce more torque. Instead like poles facing each other are used to cancel out the magnetic field between them and produce less torque.

U.S. Pat. No. 5,337,862 does improve the efficiency of the magnetic circuit. The design provides incremental improvements to the efficiency of the magnetic circuit design but does not produce quantum improvements in torque. Also, the numerous magnets need to be accurately mounted on the support rings, this increases assembly costs and the chance for error in aligning the magnets.

Finally U.S. Pat. Nos. 4,844,220 and 4,974,706 are simple designs with low cost machining and assembly operations. The ability to increase torque output is limited due to the single permanent magnet used. Also the torque producing powder is placed on the face of the rotor instead of the periphery. This reduces the radius at which the torque producing powder is placed. Since the torque is calculated as force multiplied by the distance from the center of rotation, it follows that reducing the radius reduces torque output.

OBJECTS AND ADVANTAGES

It is among the objects and advantages of the present invention to create a versatile magnetic circuit design which can be used in magnetic particle devices. Another object is to provide a magnetic circuit design with alternating magnetic polarity designed to increase the intensity of the magnetic field and thereby torque which can be produced for a given size device. Yet another object of the invention is to maximize torque and heat dissipation by placing the torque producing element as close to the outside diameter of the device as possible.

Another object of this invention is to provide a magnetic circuit design which uses low cost parts and simple assembly procedures thereby making high volume production economically possible.

A further object of the present invention is to provide a magnetic circuit design which can easily increase magnetic field strength with a relatively small increase in length of the clutch.

Still a further object of the present invention is to provide a magnetic circuit design which does not require the use of an external power supply to generate a magnetic field. This results in a lower total cost, self contained, reliable device. Further objects and advantages of the magnetic circuit design will become apparent from the consideration of the ensuing description and drawings.

SUMMARY OF THE INVENTION

The present invention is used as a magnetic particle clutch. The device comprises a rotary shaft assembly consisting of a series of magnetically conductive, round washers and permanent magnets stacked, with alternating magnetic polarity, along the length of the shaft. They are bonded to the shaft and concentric with the shaft. The magnets are mounted on each side of the washers with similar magnetic poles facing each other. This creates a very strong bucking magnetic field which passes radially outward through the washer.

A second assembly consists of a magnetically conductive cylinder with housings pressed into each end. The shaft assembly is mounted concentrically inside the cylinder assembly. The shaft assembly is relatively rotatable with respect to the cylinder by pressed in bearings which are mounted in each end housing.

The inside diameter of the cylinder is slightly larger than the outside diameter of the washers and magnets. An annular air gap is thereby created and filled with a fine, magnetic powder. The magnetic field created by the permanent magnets acts upon the magnetic powder and links the shaft assembly to the cover assembly.

There are numerous advantages to the configurations previously described. It has been shown experimentally that a series of thin permanent magnets mounted with alternating magnetic polarity produces more torque for a given axial length than one continuous magnet. This is due to the bucking magnetic fields and efficiency of the short magnetic flux path. Another advantage of the short flux path is that a thinner cylinder wall can be used and still contain the magnetic field. This minimizes the outside diameter of the clutch and rotational inertia of the cylinder assembly. Yet another advantage is the ability to increase torque of the clutch simply by stacking additional magnets and washers along the shaft. Still another advantage is the lower cost due to the economies of scale of using multiple identical parts.

Yet another advantage to the present invention is the torque producing element is as close to the outside diameter of the clutch as possible. Torque is defined as force multiplied by the distance from the center of rotation. By placing the torque producing element as far from the center of rotation as possible, torque is maximized. Also the cylinder is the primary means for removing heat. Heat is dissipated by convection and radiation to the surroundings. This reduces heat being conducted through the shaft to other components attached to the shaft. Heat dissipation is maximized since the heat, and torque, producing magnetic particle element is in direct contact with the cylinder.

The air gap is critical in producing the highest torque and in making torque consistent between clutches. With this invention, the gap is a function of the washer and cylinder diameters. This eliminates the chance for errors during assembly unlike axial gap designs which require careful assembly to compensate for stack-up tolerances of multiple axially mounted parts. The washers and magnets are located in position by sliding them over the shaft thereby further simplifying and increasing the accuracy of the clutch assembly.

BRIEF DESCRIPTION OF THE DRAWINGS

FIG. 8 is a sectional view taken along the center axis of the device in FIG. 1 showing the magnetic flux path and relative polarity of the magnets.

DESCRIPTION OF THE PREFERRED EMBODIMENT—FIGS. 1–2

Figure 1:
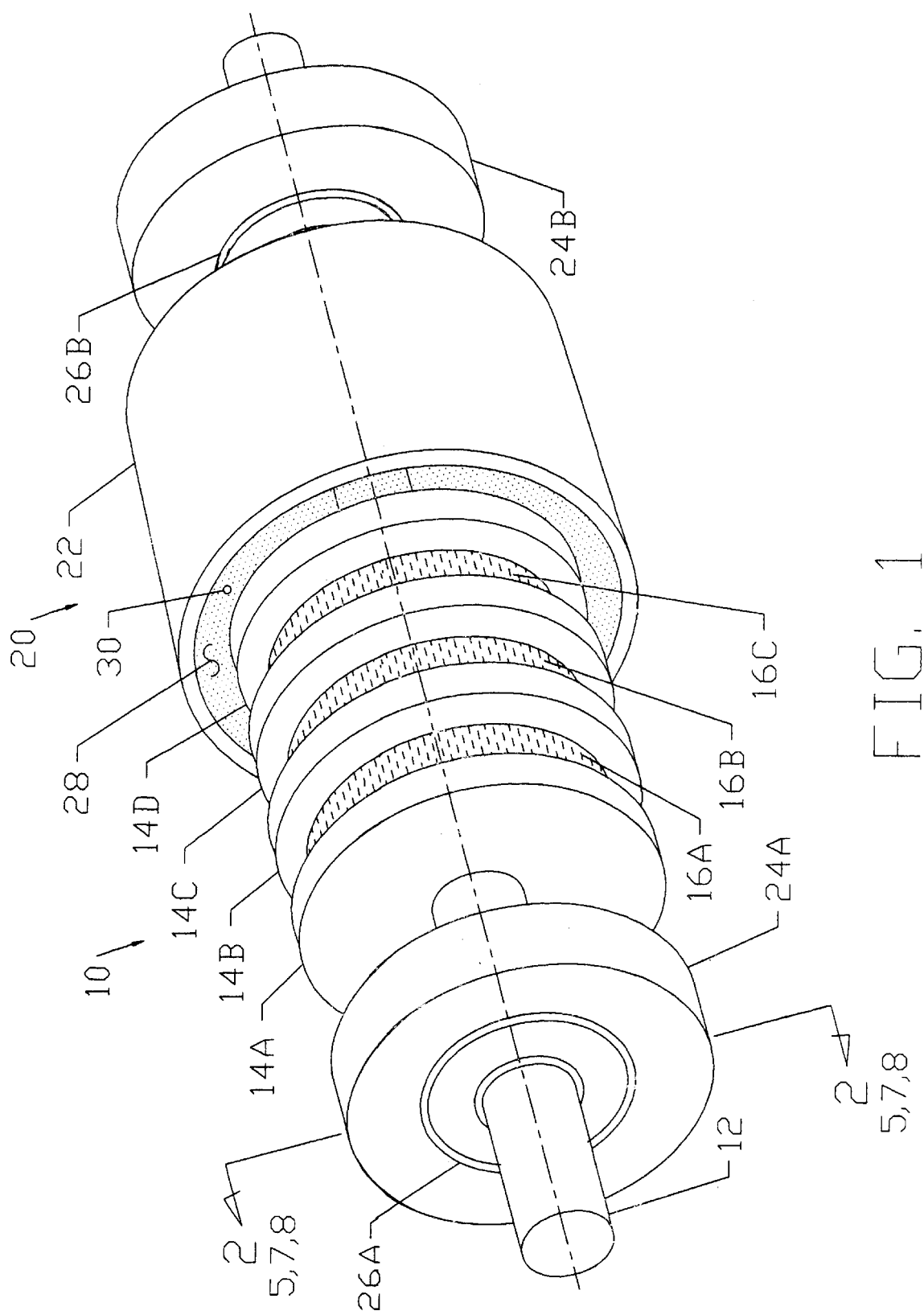
FIG. 1 is a perspective view of the basic construction and components of the magnetic device.

A perspective view of a typical embodiment of the clutch is shown in FIG. 1. The device comprises a shaft assembly 10. The shaft assembly consists of a rotary shaft 12 with a series of round washers 14A, 14B, 14C, and 14D pressed onto the shaft. These washers are made of low carbon (eg. AISI 1018) steel and are magnetically conductive. The thickness is approximately 1/15 the washer's outer diameter. A ring magnet 16A, 16B, and 16C is placed between each washer. The diameter is slightly less than the washer's diameter. The magnet's thickness is approximately 1/15 its diameter. "High-energy" magnets which have a typical energy product of 27 mega-gauss oersteds are used. The material composition is neodymium, iron, and boron. The magnets 16 are bonded to the washers 14 with a suitable adhesive. The magnets 16 are magnetized through the thickness with each face being of opposite magnetic polarity. They are bonded to the washers 14 with like poles facing each other.

FIG. 1 also shows a cylinder assembly 20. This assembly is comprised of a cylinder 22 with an end housing 24A and 24B pressed into each end of the cylinder. The cylinder is made of low carbon (eg. AISI 1018) steel and is magnetically conductive. A bearing 26A and 26B is press-fit into the end housings 24A and 24B.

The shaft assembly is mounted concentrically inside the cylinder. It is held in radial and axial location by being pressed or adhesively bonded to the inner race of bearings 26. The outer diameter of the washers 14 and magnets 16 are necessarily smaller than the inside diameter of the cylinder 22. An annular air gap 28 is thereby created between the two assemblies. The air gap 28 is 0.020" to 0.080" depending on the size of the clutch and torque output desired. A fine magnetic powder 30 fills the air gap 28.

Figure 2:
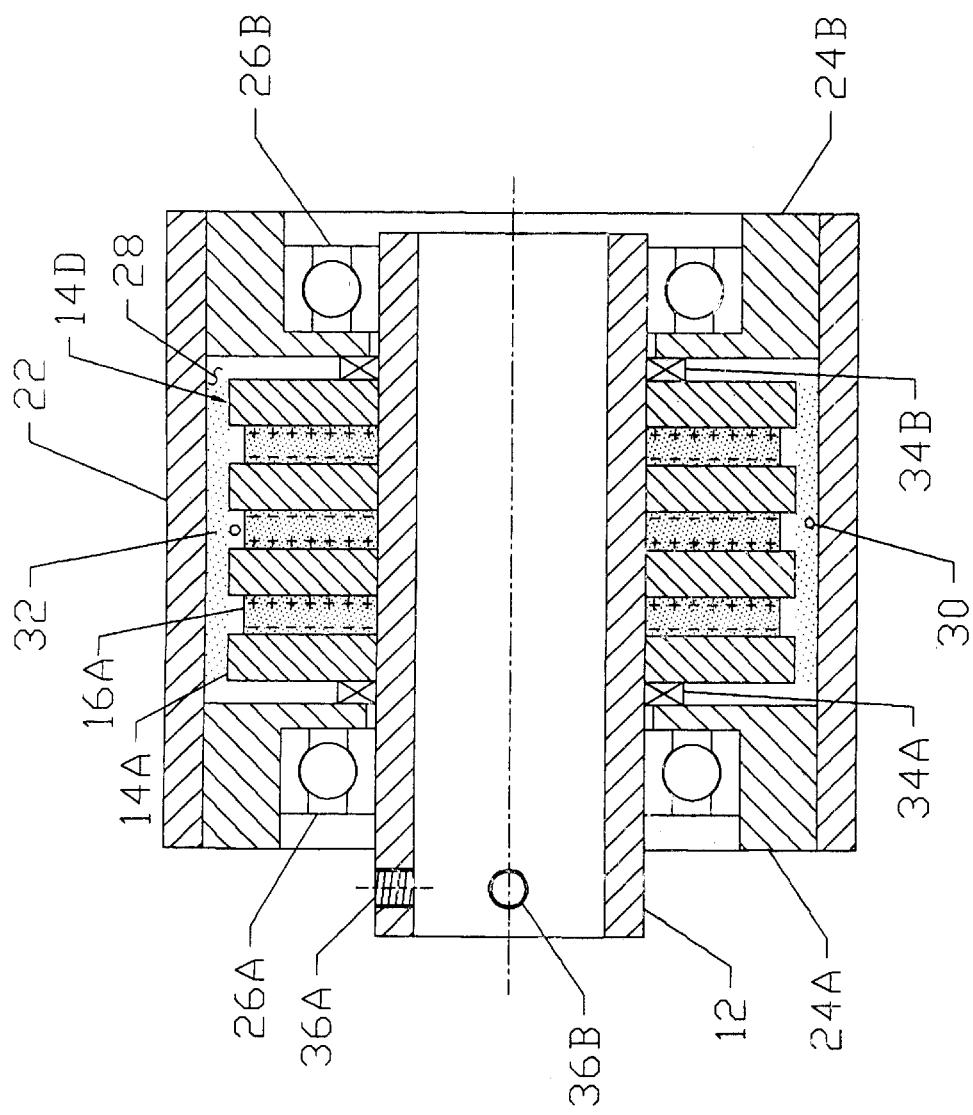
FIG. 2 is a sectional view taken along the center axis of the device in FIG. 1 and shows the components of the device.

This powder is made from a magnetic material such as iron. As shown in FIG. 2., an air pocket 32 exists between washers 14 since washers 14 are larger in diameter than magnets 16.

Referring to FIG. 2, a seal 34A is fitted between the end washer 14A and end housing 24A. An identical seal 34B is fitted between washer 14D and housinf 24B. These seals prevent any stray powder from entering and destroying bearings 26.

Also shown in FIG. 2, are a pair of set screws 36A and 36B. The set screws 36 are used to clamp the clutch shaft 12 to an external shaft.

Operation of the Invention—FIGS. 1–10

In operation, the shaft assembly 10 rotates with respect to the cylinder assembly 20. FIG. 8 shows the magnetic flux path and relative magnetic orientation of the magnets 16. The actual north and south orientation of the magnets is not important. The only requirement is that like magnetic poles must face each other to produce the focused magnetic flux path.

By making the diameter of the washers 14 slightly larger than the magnet 16, the magnetic flux will pass radially outward from the washers 14 to the cylinder 22. The air gap 28 is about half the thickness of the magnet 16 and correspondingly, the distance between washers 14. In this way, the magnetic field is stronger between washers 14 and cylinder 22 than between individual washers 14. This further urges the powder radially outward between washers 14 and cylinder 22.

Because the magnets 16 are slightly smaller in diameter than washers 14, an air pocket 26 is created. The pocket serves as a reservoir for excess powder 30. This aids in assembly and compensates for any variations in concentricity between inside and outside diameters of the magnets 16.

When used as a magnetic particle clutch as shown in FIG. 1, powder fills the air gap 28 and "links" the shaft assembly to the cylinder assembly 20. The shaft assembly 10 slides over an external shaft and a pulley can be mounted to the cylinder assembly 20. The two assemblies rotate in unison until the torque limit of the clutch is exceeded. Then the powder 30 slips on itself and torque is largely the same as at initial breakaway. Slip torque is virtually constant regardless of differences in rotational speeds of the shaft assembly and cylinder assembly.

When used as a brake, The cylinder assembly 20 is held stationary and only the shaft assembly 10 rotates. The powder 30 slips on itself when the shaft 12 rotates. A pulley is commonly attached to the shaft 12. The shaft 12 is solid to reduce cost and make the shaft stronger.

Torque output depends on the size of the clutch, thickness and magnetic strength of the magnets, size of the air gap, and number of magnets and washers use. By varying any of these parameters, torque can be adjusted to meet the users needs. While the description above lists many specificities, these should not be construed as limitations on the scope of the invention, but rather an exemplification of one preferred embodiment thereof. Many other variations are possible.

Figure 3:
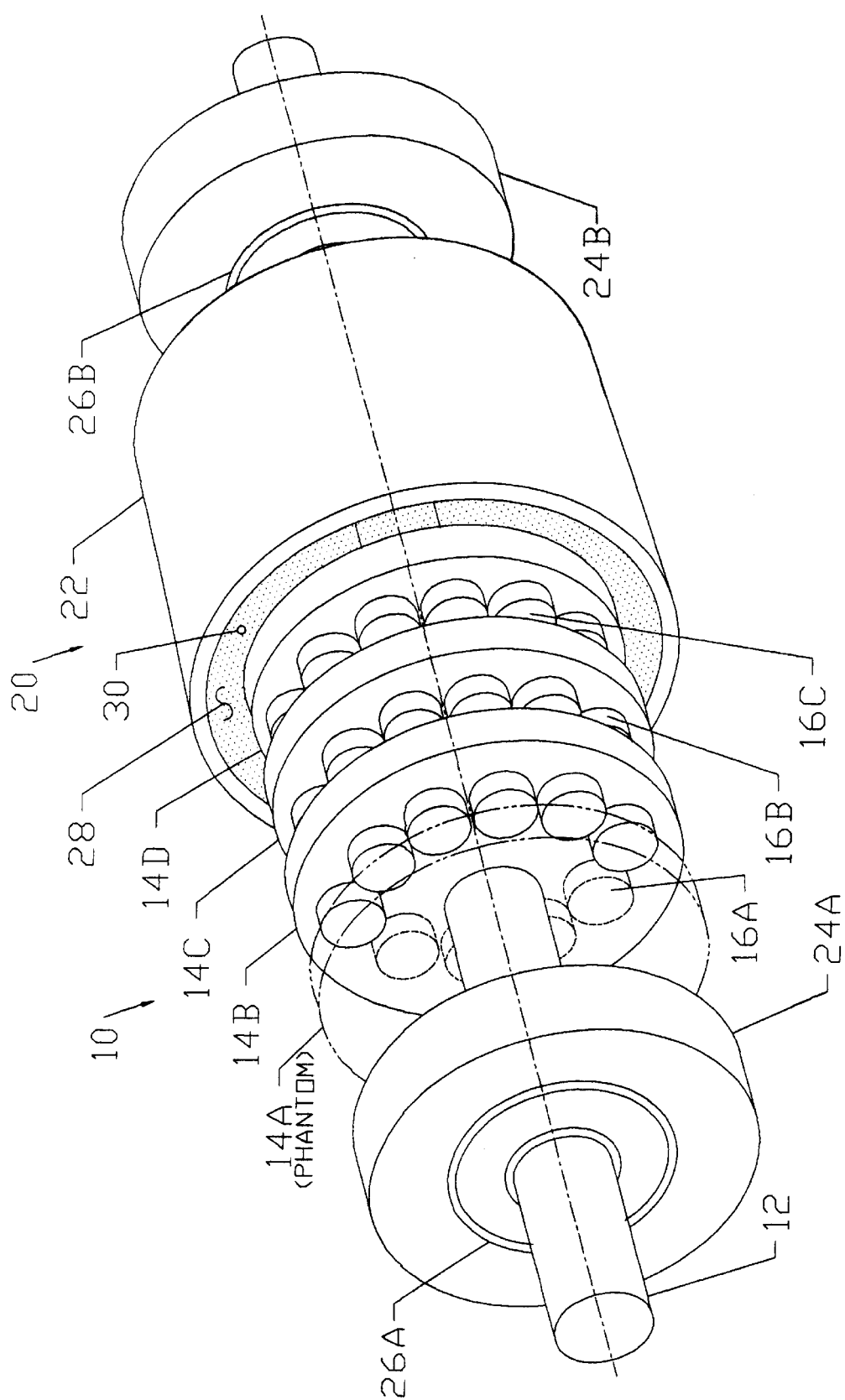
FIG. 3 shows a configuration using a multiplicity of "plug" magnets mounted in a ring pattern.
Figure 4:
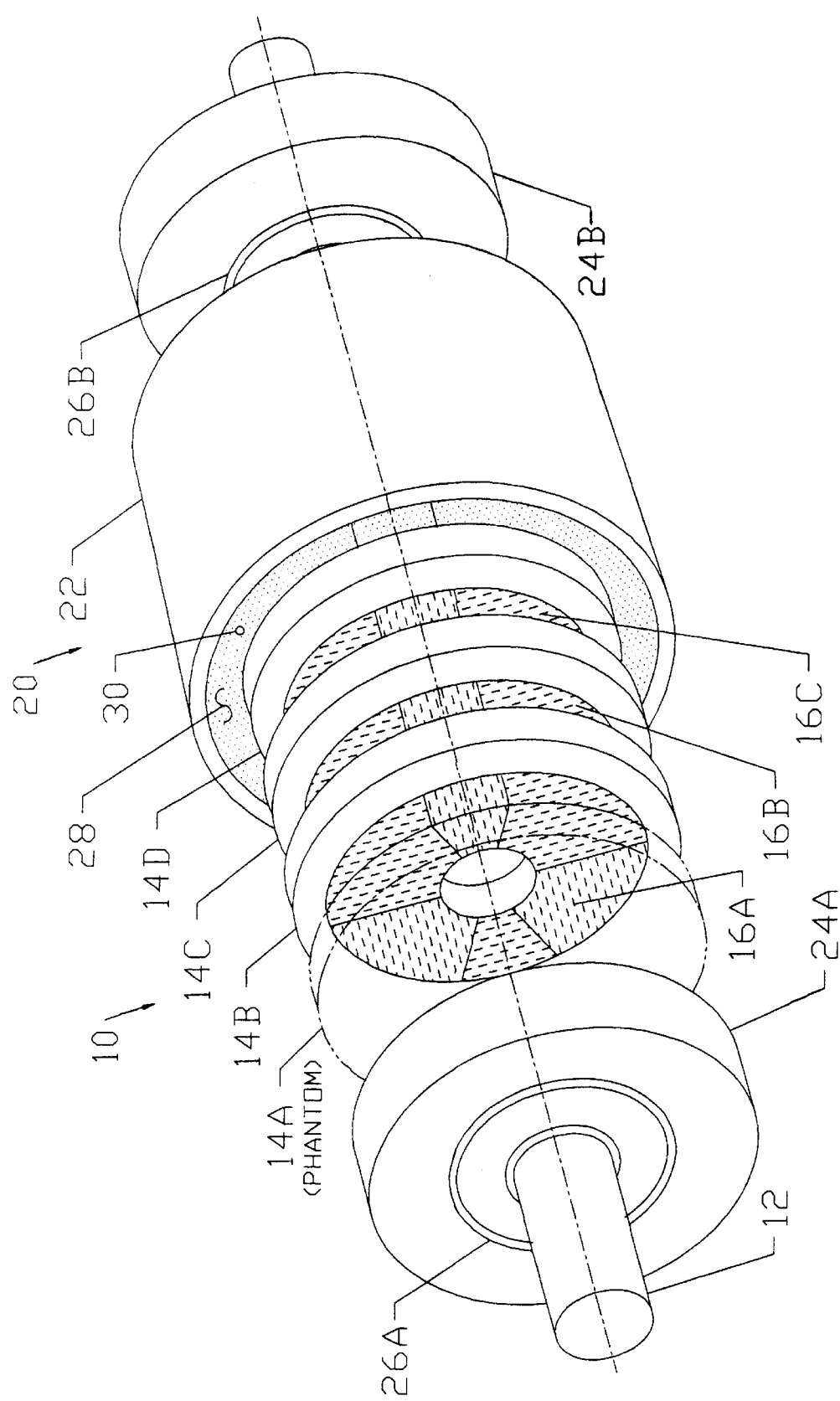
FIG. 4 shows a configuration using arc segments of alternating magnetic polarity.
Figure 5:
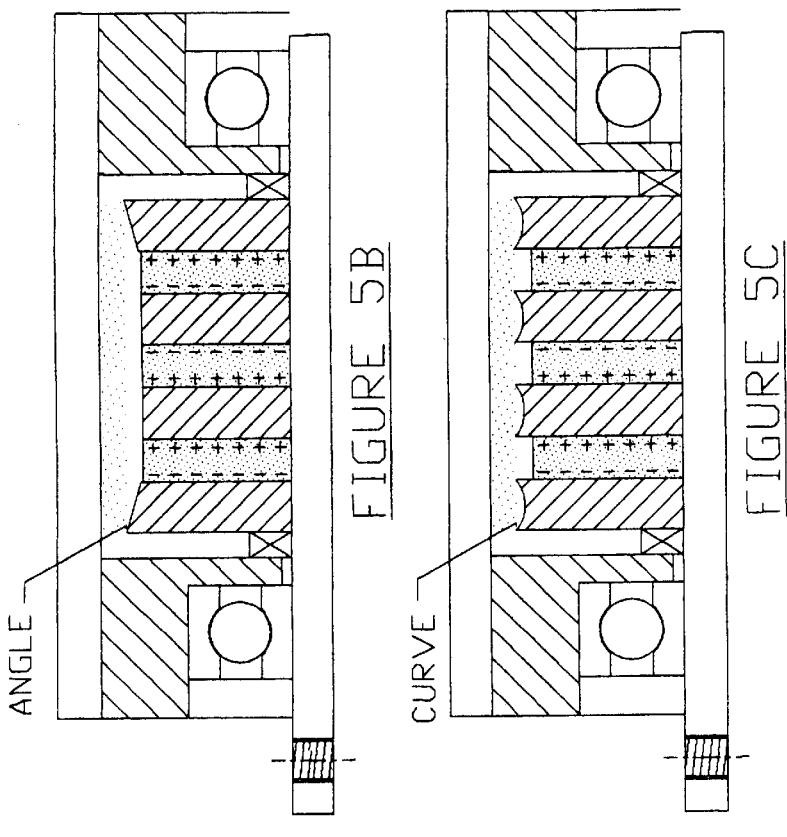
FIG. 5 shows a sample of different shapes that can be used for the outer edge of the washers.
Figure 5:
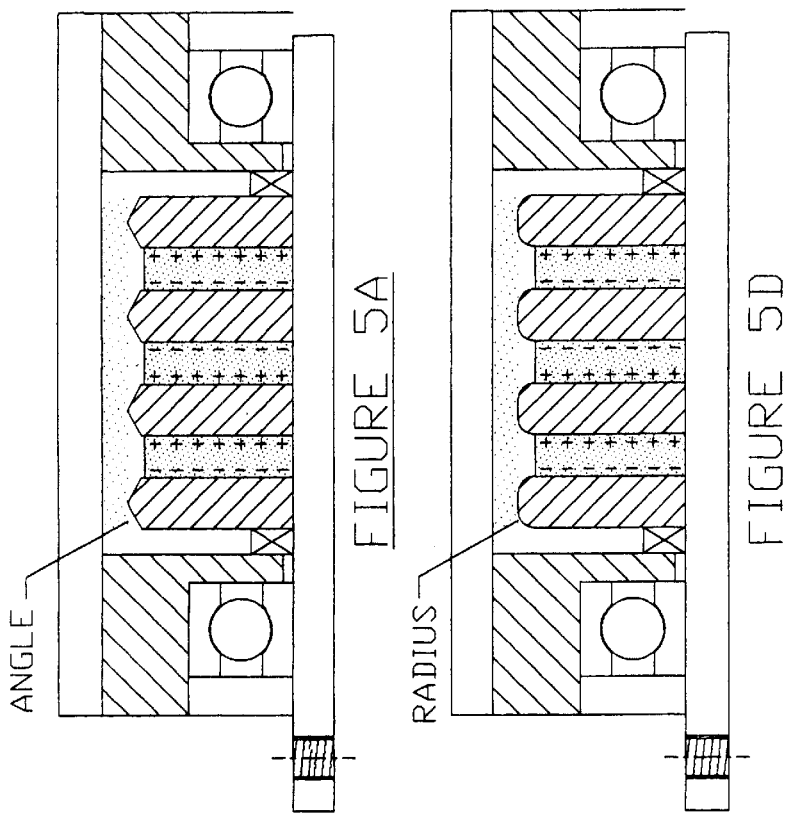

For example, there are a variety of modifications to the shape or type of magnets that can be used. Instead of one ring magnet mounted on each washer, FIG. 3 shows a ring of smaller plug magnets being used. This is particularly useful in larger sized clutches where it is not possible to make one large ring magnet from high energy material. FIG. 4 shows arc segment magnets being used. Again, the smaller magnet size is necessary when making larger size clutches. In this figure, the arcs are shown with alternating magnetic polarity. This creates a circumferentially alternating magnetic field. Also, electric coils could be substituted for permanent magnets.

The magnets can be magnetized either through their thickness or radially. Axial magnetization will create an alternating magnetic field with each magnet. If radial magnetization is used; a short, efficient, alternating magnetic field is still created. In this case, two magnets are required to create an axial alternating magnetic field.

The washers can be the same or smaller diameter than the magnets. FIGS. 5A, 5B, and 5C show some different designs for the outer edges of the washers. This can be done to alter or provide better flux flow. The thickness of the washers and magnets does not have to be 1/15 of their diameter. It can be more or less depending on the size of the clutch, torque, or other operating conditions.

The washers do not have to be round. Different torque characteristics can be achieved by using different shapes. For example, hexagonal shaped washers will provide about double the torque upon immediate reversal of the direction of rotation. It is believed that this occurs as the powder redistributes itself in the non-symmetrical shaped air pocket.

Figure 6:
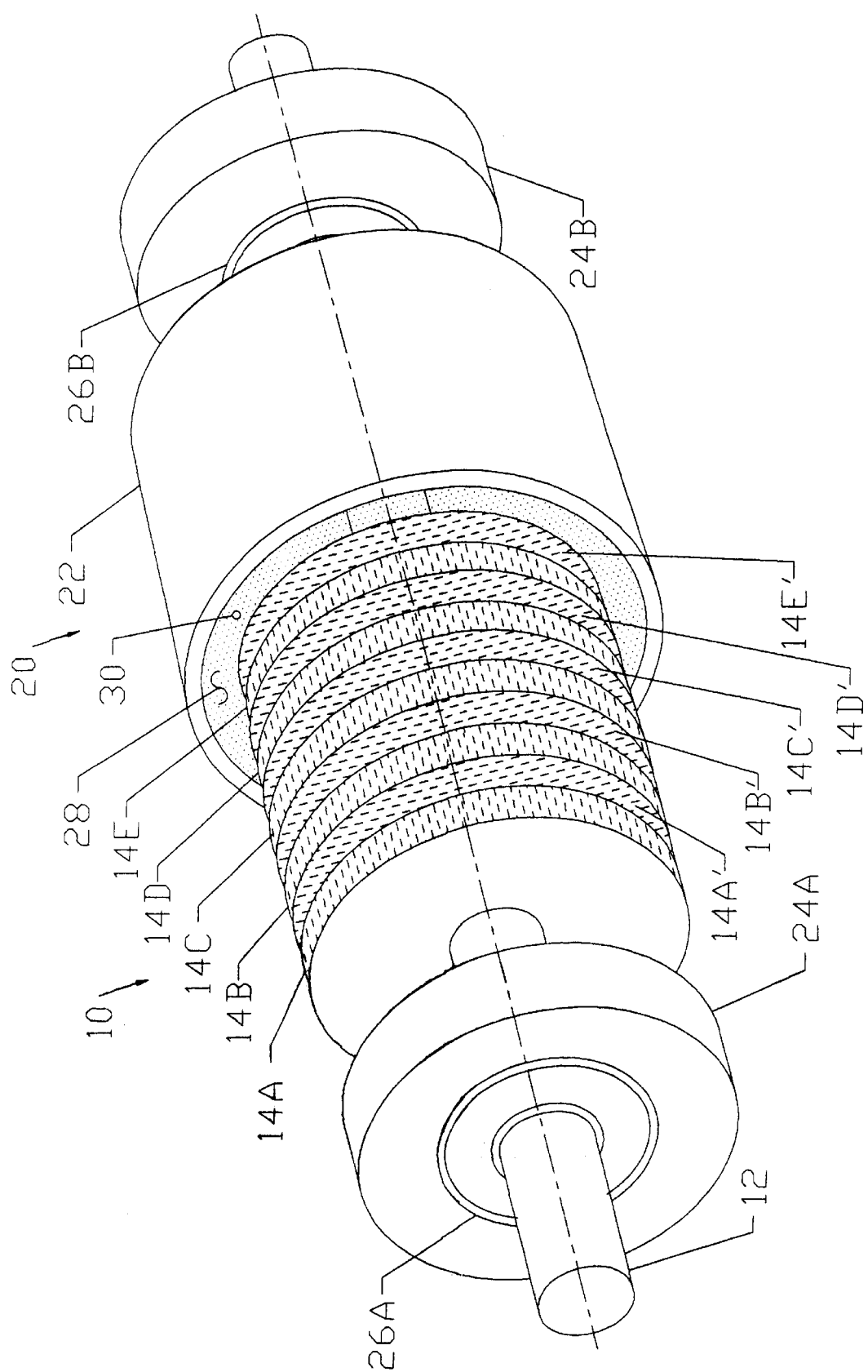
FIG. 6 shows a configuration where only magnets are stacked along the shaft.
Figure 7:
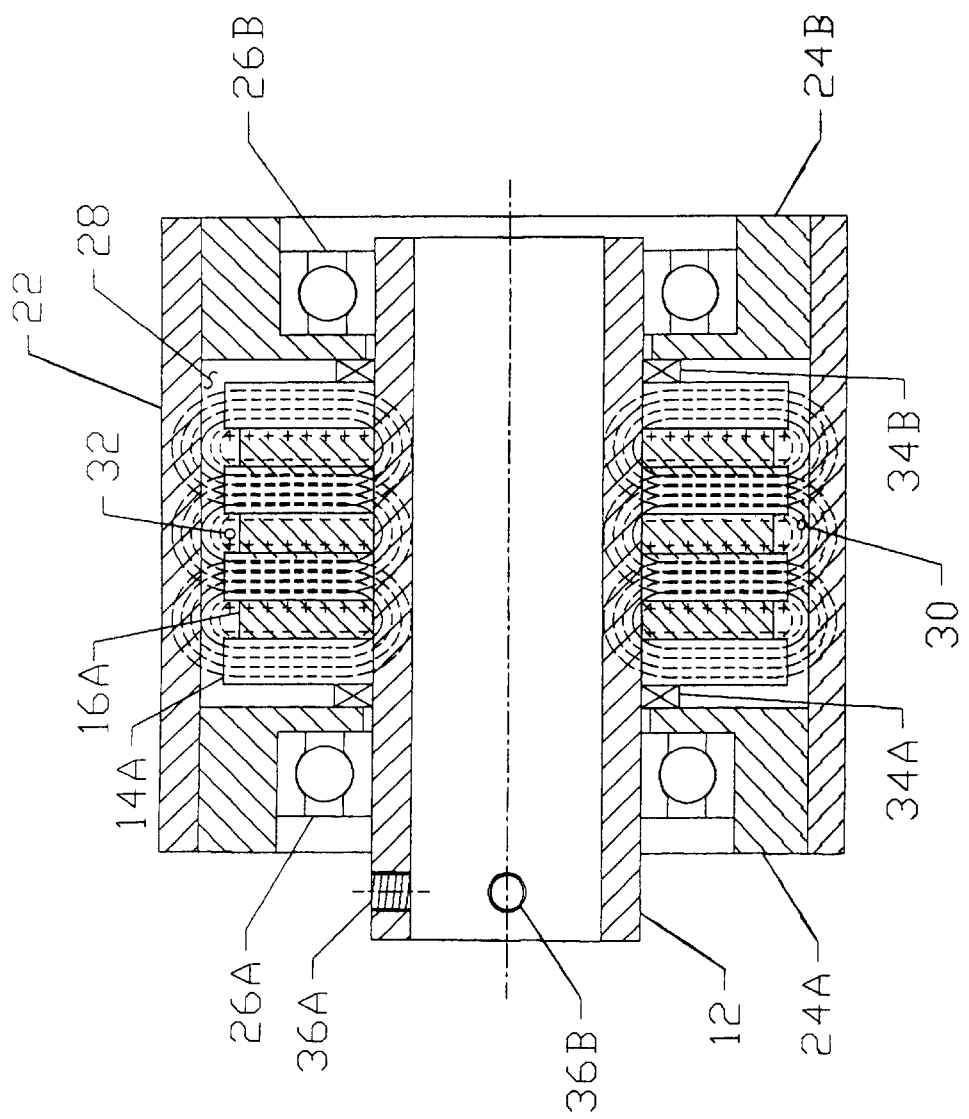

The washers do not have to be magnetically conductive. A non-conductive material such as stainless steel can be used just to space the magnets apart to prevent the bucking magnetic fields from cancelling themselves out. It is not necessary to use the washers at all. FIG. 6 shows the magnets being bonded together with like poles facing each other.

While four washers and three magnets are shown in FIG. 1, this is not a requirement. Any amount from one magnet and two washers up to and infinite number of washers and magnets can be used. In this way, torque can easily be increased or decreased simply by adding or subtracting washers and magnets.

Thus the reader can see that this device provides improved torque and function over what has been previously available. Torque output per size is higher than what has been previously available while the number of components has been reduced. The simple design eases assembly and reduces the chances for error thereby making high-volume production practical.

While the invention has been shown and described with respect to a specific embodiment and modification thereof, this is intended for the purpose of illustration rather than limitation and other variations and modifications will be apparent to those skilled in the art all within the intended spirit and scope of the invention. Accordingly, the patent is not to be limited in scope and effect to the specific forms herein shown and described not in any other way that is inconsistent with the extent to which the progress in the art has been advanced by the invention.

Therefore the scope of the magnetic circuit should be determined by the appended claims and their legal equivalents, rather than by the exampled given above.

What is claimed is:

1. A magnetic particle device comprising:

A rotor assembly comprising an output shaft to which is attached along the length of said shaft a plurality of magnets in relatively close proximity to each other where the plurality of said magnets have like magnetic poles confronting each other to produce an intensified magnetic force between them greater than that of one said magnet alone an outer shell comprised of a magnetically permeable material where said rotor assembly is positioned substantially inside said magnetically permeable outer shell and which largely contains the magnetic field created by said rotor assembly and where said magnetically permeable outer shell constitutes an axially nearly continuous inner surface such that a generally annular gap which excludes the use of magnetic coils is created between the outer surface of said magnets and inner surface of said magnetically permeable outer shell a magnetically permeable powder located in said generally annular gap where said magnetically permeable powder is magnetically held in a magnetic flux path between said rotor and said outer shell which allows for relative motion with continued resistance to said motion between said rotor assembly and said outer shell once a predetermined force level has been exceeded.

2. The device as defined in claim 1 further including a plurality of generally ring shaped, magnetically permeable material placed between adjacent said magnets.

3. The device as defined in claim 2 where said plurality of magnets are generally ring-shaped and magnetized in an axial direction parallel to said shaft.

4. The device as defined in claim 2 where said magnets consist of a multiplicity of smaller plug shaped magnets placed on both sides of said generally ring shaped magnetically permeable material with like magnetic poles confronting each other to produce an intensified magnetic force between them greater than that of one said magnet alone.

5. The device as defined in claim 2 where said magnets consist of a multiplicity of arc shaped magnets placed on both sides of said generally ring shaped magnetically permeable material with like magnetic poles confronting each other to produce an intensified magnetic force between them greater than that of one said magnet alone and where succesive magnetic poles alternate radially around said shaft.

6. The device as defined in claim 1 where said rotor assembly and said outer shell are held in fixed location with each other by use of a bearing located between said shaft and said outer shell where said bearing allows motion between said rotor and said outer shell.

7. The device as defined in claim 1 where said magnets are electromagnets.

8. The device as defined in claim 1 further including a sealing means whereby said magnetically permeable powder is generally constrained in said annular air gap between said magnets and said magnetically permeable outer shell.

* * * * *